United States Patent
Kukehalli Subramanya

(10) Patent No.: US 11,526,620 B2
(45) Date of Patent: Dec. 13, 2022

(54) IMPERSONATION FOR A FEDERATED USER

(71) Applicant: Oracle International Corporation, Redwood Shores, CA (US)

(72) Inventor: Ramya Kukehalli Subramanya, Redmond, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 784 days.

(21) Appl. No.: 16/162,099

(22) Filed: Oct. 16, 2018

(65) Prior Publication Data

US 2019/0332790 A1 Oct. 31, 2019

Related U.S. Application Data

(60) Provisional application No. 62/663,962, filed on Apr. 27, 2018.

(51) Int. Cl.
*G06F 21/62* (2013.01)
*H04L 9/40* (2022.01)
(Continued)

(52) U.S. Cl.
CPC ........ *G06F 21/6218* (2013.01); *G06F 21/335* (2013.01); *G06F 21/604* (2013.01);
(Continued)

(58) Field of Classification Search
CPC .. G06F 21/6218; G06F 21/604; G06F 21/335; G06F 2221/2137;
(Continued)

(56) References Cited

U.S. PATENT DOCUMENTS 7,225,256 B2   5/2007  Villavicencio
7,765,298 B2 * 7/2010  Villavicencio .......... H04L 63/08
                                                      709/225

(Continued)

OTHER PUBLICATIONS

Transcript and associated screen shots for YouTube video "How to Write the Plugins Using the helper Classes with Example in Dynamics 365 (MS CRM)", by CRMONCE: MS Dynamics Solutions, published on Dec. 2, 2016. Retrieved from the Internet: https://www.youtube.com/watch?v=cGlu10kltp4 (total length of video 30:16), 13 pages.

(Continued)

*Primary Examiner* — Jeffrey D. Popham
(74) *Attorney, Agent, or Firm* — Kilpatrick Townsend & Stockton LLP

(57) ABSTRACT

Techniques for enabling impersonation without requiring an access manager (AM) controlling access to a computing resource to have direct access to user information. The AM receives an impersonation request for a first user to impersonate a second user, the request being received during a first session initiated by the first user. The second user has an access privilege that permits access to the computing resource. The AM causes information to be obtained from an identity provider, the information being stored in a location inaccessible to the AM and indicating whether the first user has been granted permission to impersonate the second user. An impersonation session is initiated based on determining, using the information obtained from the identity provider, that the first user has been granted permission to impersonate the second user. The initiating comprises switching a user associated with the first session from the first user to the second user.

9 Claims, 12 Drawing Sheets

(51) Int. Cl.
*G06F 21/60* (2013.01)
*G06F 21/33* (2013.01)

(52) U.S. Cl.
CPC .......... *H04L 63/102* (2013.01); *H04L 63/108* (2013.01); *G06F 2221/2137* (2013.01); *G06F 2221/2141* (2013.01); *G06F 2221/2145* (2013.01)

(58) Field of Classification Search
CPC ..... G06F 2221/2141; G06F 2221/2145; G06F 21/33; H04L 63/102; H04L 63/108; H04L 63/10
See application file for complete search history.

(56) References Cited

U.S. PATENT DOCUMENTS

| | | | |
|---|---|---|---|
| 8,756,704 | B2 | 6/2014 | Castellucci et al. |
| 8,955,149 | B1* | 2/2015 | Baer .................. G06F 21/6218 726/28 |
| 9,674,191 | B2 | 6/2017 | Chaplik et al. |
| 2002/0078365 | A1 | 6/2002 | Burnett et al. |
| 2003/0105862 | A1* | 6/2003 | Villavicencio ........ H04L 63/168 709/225 |
| 2017/0070498 | A1 | 3/2017 | Fork et al. |
| 2017/0118222 | A1 | 4/2017 | Subramanya et al. |

OTHER PUBLICATIONS

Connolly; Stephen, *Impersonation Plugin*, Jenkins, Jenkins Wiki, last modified Sep. 19, 2016, Retrieved from the Internet: https://w iki.jenkins.io/display/JENKINS/ Impersonation+Rugin, on Feb. 22, 2018, 1 page.

*Authorize Project Plugin*, created by ikedam, Jenkins, Jenkins Wiki,, Version 1.3.0 Feb. 12, 2017. Retrieved from the Internet: https://w iki.jenkins.io/display/JENKINS/Authorize+ Project+ plugin, on Feb. 22, 2018, 6 pages.

Mathers et al., *When to Use Identity Delegation*, Microsoft Docs, May 31, 2017, Retrieved from the Internet from: https://docs.microsoft. com/en-us/windows-server/identity/ad-fs/design/when-to-use-identity-delegation, on Feb. 22, 2018 6 pages.

* cited by examiner

IMPERSONATION FOR A FEDERATED USER

CROSS-REFERENCES TO RELATED APPLICATIONS

The present application is a non-provisional of and claims the benefit and priority under 35 U.S.C. 119(e) of U.S. Provisional Application No. 62/663,962, filed Apr. 27, 2018, entitled "IMPERSONATION FOR A FEDERATED USER". The content of U.S. Provisional Application No. 62/663,962 is incorporated herein by reference in its entirety for all purposes.

BACKGROUND

Some computer systems permit a first user to temporarily assign his or her access privileges to a second user, thereby enabling the second user to impersonate the first user for purposes of accessing resources managed by a computer system. Impersonation is supported, for example, in Oracle Access Manager (OAM) software. The second user (i.e., the impersonator) may log into the computer system to establish an impersonation session during which the second user is permitted to request access to resources that the first user is authorized to access.

In some instances, it is desirable to configure impersonation settings such as which users are allowed to impersonate, the time period for which a user is allowed to impersonate, and which applications or other resources an impersonator can access during an impersonation session. Such settings are usually configured in an identity store containing information about the impersonator. However, depending on the computing environment, the device or system that controls access to resources (e.g., a server running OAM) may not have access to the identity store. For example, in a federated environment, the identity of the users may be managed by an independent identity provider. The impersonation session cannot begin without accessing the identity store. Further, when an impersonation session begins, the impersonator may be requested to re-authenticate, a process that also requires access to the identity store. One solution to this problem is to duplicate user information contained in the identity store in a separate datastore that is accessible to the device or system that controls access. After copying the contents of the identity store into the separate datastore, the datastores need to be kept synchronized.

BRIEF SUMMARY

The present disclosure relates generally to enabling impersonation, and more particularly to techniques for enabling impersonation for federated users. Impersonation refers to a scenario, in a computing environment, in which a first user (the impersonator) takes on the role of a second user (the impersonatee). Impersonation can be performed to convert a computing session initiated by the impersonator into an "impersonation session" in which the impersonator assumes the identity of the impersonatee.

Example embodiments are directed to a system and methods for impersonation in a federated environment, based on authentication performed using user information that is accessible to an identity provider (IDP), but not accessible to an access manager (AM) that controls access to resources and is responsible for starting and/or managing an impersonation session. The IDP may operate or manage the identity store independently. The AM can be, for example, a physical or virtual server running Oracle Access Manager. The AM can be a component of an access management system (AMS) that includes other computing devices or resources that support impersonation.

In certain embodiments, the AM has access to a default identity store and impersonation is enabled without having to duplicate user information contained in an identity store of an IDP (e.g., a user identifier (ID), user credentials, impersonation settings configured for the user, and/or other user attributes). User attributes used to determine whether a user has been granted permission to impersonate another user are referred to herein as "impersonation attributes."

In certain embodiments, an AM receives an impersonation request, determines that the AM doesn't have access to the user attributes needed for determining whether a user has been granted permission to impersonate, and delegates the responsibility for making this determination to an IDP that has access to the user attributes. In response to the IDP determining that the user has been granted permission to impersonate, the AM may start the impersonation session by switching the user associated with a current session from the impersonator to the impersonatee.

In certain embodiments, an AM is configured to handle an impersonation request by mapping the impersonation request to a particular IDP. The IDP may be determined by invoking an impersonation plugin/extension/add-on or a standalone application that handles impersonation processing, including communicating with the IDP to determine whether the impersonation request should be granted. Other mechanisms for mapping the impersonation request to an IDP without the direct involvement of the AM are also possible.

In certain embodiments, a computer-implemented method involves receiving, by an access manager that controls access to a computing resource, an impersonation request for a first user to impersonate a second user. The impersonation request is received during a first session initiated by the first user. The second user has an access privilege that permits access to the computing resource. The method further involves causing, by the access manager, information to be obtained from an identity provider, the information being stored in a location inaccessible to the access manager and indicating whether the first user has been granted permission to impersonate the second user. The method further involves determining, based on the information obtained from the identity provider, that the first user has been granted permission to impersonate the second user; and based on the determining that the first user has been granted permission to impersonate the second user, initiating, by the access manager, an impersonation session. The initiating comprises switching a user associated with the first session from the first user to the second user.

The foregoing, together with other features and embodiments will become more apparent upon referring to the following specification, claims, and accompanying drawings.

BRIEF DESCRIPTION OF THE DRAWINGS

Illustrative examples are described in detail below with reference to the following figures.

DETAILED DESCRIPTION

Figure 1:
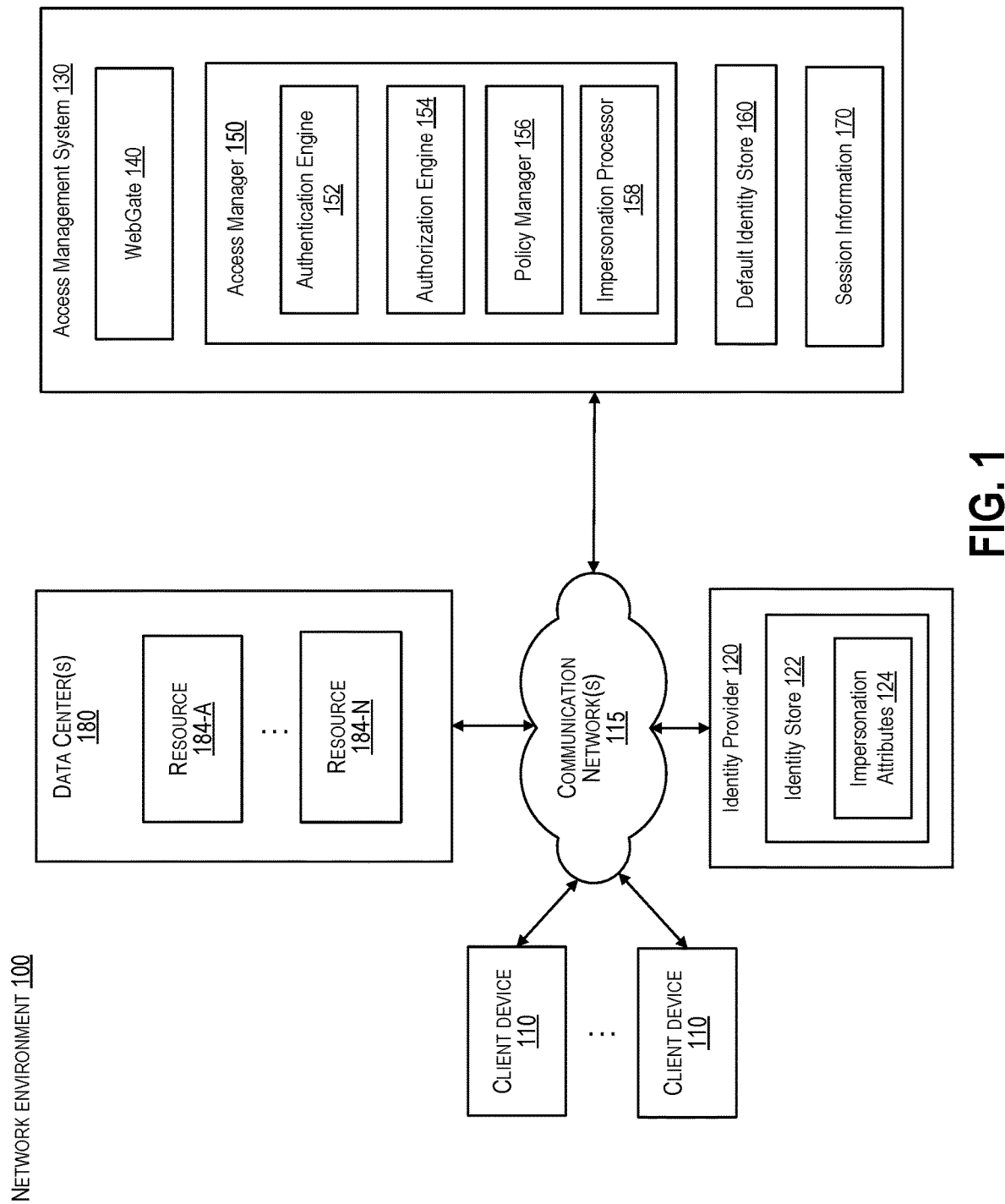
FIG. 1 is a simplified block diagram of a network environment according to an exemplary embodiment of the present disclosure.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to enabling impersonation, and more particularly to techniques for enabling impersonation for federated users. Impersonation refers to a scenario, in a computing environment, in which a first user (the impersonator) takes on the role of a second user (the impersonatee). Impersonation can be performed to convert a computing session initiated by the impersonator into an "impersonation session" in which the impersonator assumes the identity of the impersonatee.

Example embodiments are directed to a system and methods for impersonation in a federated environment, based on authentication performed using user information that is accessible to an identity provider (IDP), but not accessible to an access manager (AM) that controls access to resources and is responsible for starting and/or managing an impersonation session. The IDP may operate or manage the identity store independently of the AM. The AM can be, for example, a physical or virtual server running Oracle Access Manager software. The AM can be a component of an access management system (AMS) that includes other computing devices or resources that support impersonation.

In certain embodiments, the AM has access to a default identity store and impersonation is enabled without having to duplicate user information contained in an identity store of an IDP (e.g., a user identifier (ID), user credentials, impersonation settings configured for the user, and/or other user attributes), e.g., without having to copy the user information into the default identity store.

In certain embodiments, an AM receives an impersonation request, determines that the AM doesn't have access to the user attributes needed for determining whether to grant the impersonation request, and delegates the responsibility for determining whether to grant the impersonation request to an IDP that has access to the user attributes. In response to the IDP determining that the request should be granted, the AM may start the impersonation session by switching the user associated with a current session from the impersonator to the impersonatee.

In certain embodiments, an AM is configured to handle an impersonation request by mapping the impersonation request to a particular IDP. The IDP may be determined by invoking an impersonation plugin/extension/add-on or a standalone application that handles impersonation processing, including communicating with the IDP to determine whether the impersonation request should be granted. Other mechanisms for mapping the impersonation request to an IDP without the direct involvement of the AM are also possible.

A session is a set of computing resources established for a limited period of time between a resource protecting entity (e.g., an AMS) and a client device for the purpose of servicing requests communicated from the client device to the resource protecting entity. Such requests may include requests for access to a particular resource. Resources available for access may include any item managed and/or stored by one or more data centers and available for access by one or more users. Such items include files (such as documents, spreadsheets, and images), computational resources (such as processing power, cloud storage, and network communication bandwidth), software applications, and/or the like. A resource may be protected or unprotected. If a resource is protected, a user may need to be authenticated and authorized in order to access the resource. Different users may have different levels of access privileges. For example, an impersonator may have access to fewer or a different set of resources when logging in using his or her own credentials compared to the resources available to an impersonatee.

Sessions can be created for a particular user and for a particular application running on the client device and/or a particular set of processes running within the application. To begin an impersonation session, the impersonator needs to have been granted permission to impersonate the impersonatee. In certain embodiments, this permission can be specified by configuring impersonation attributes. For example, the impersonation attributes of a first user may specify who the first user is allowed to impersonate, when the first user is allowed to impersonate (e.g., Monday through Thursday from 10:00 am to 2:00 pm), and for how long the impersonation grant is valid (e.g., the grant expires two weeks from today).

In certain embodiments, the impersonatee may also have configured impersonation attributes, such as a list of users who have been granted permission to impersonate the impersonatee. Such permission operates to pre-authorize one or more impersonators to impersonate the impersonatee. The impersonatee may configure the impersonation attributes for himself and/or for an impersonator to whom the impersonatee wishes to grant permission. During an impersonation session, the impersonator is, for all practical purposes, the impersonatee. Although the user interacting with the computer system is the impersonator, the computer system will conduct the impersonation session in a manner similar to a regular session initiated by the impersonatee, e.g., as if the impersonatee had logged into the system directly to establish the impersonation session. The access privileges of the impersonator are not necessarily identical to those of the impersonatee. For example, in some embodiments, certain applications may be excluded from a list of applications that a particular impersonator is allowed execute during an impersonation session.

In certain embodiments, impersonation is handled by an AMS operated by a service provider that hosts or controls access to a requested resource such as an application. The resource can be located in the AMS or in another computer system (e.g., a data center) that is communicatively coupled to the AMS. The AMS may include an AM that protects resources by checking whether a user is authenticated (the user is who he or she claims to be) and authorized to access a requested resource (the user has permission to access this particular resource) when a request for a resource is received by the AMS.

FIG. 1 is a simplified block diagram of a network environment 100 according to an exemplary embodiment. Network environment 100 represents a federated environment and comprises multiple systems communicatively coupled to each other via one or more communication networks 115. The systems in FIG. 1 include one or more client devices 110, one or more data centers 180, an identity provider 120, and an AMS 130 communicatively coupled to each other via communication network(s) 115. Network environment 100 depicted in FIG. 1 is merely an example and is not intended to unduly limit the scope of claimed embodiments. One of ordinary skill in the art would recognize many possible variations, alternatives, and modifications. For example, in some implementations, network environment 100 may have more or fewer systems or components than those shown in FIG. 1, may combine two or more systems, or may have a different configuration or arrangement of systems.

Communication network 115 facilitates communications between the various systems depicted in FIG. 1. Communication network 115 can be of various types and can include one or more communication networks. Examples of communication network 115 include, without restriction, the Internet, a wide area network (WAN), a local area network (LAN), an Ethernet network, a public or private network, a wired network, a wireless network, and the like, and combinations thereof. Different communication protocols may be used to facilitate the communications, including both wired and wireless protocols such as the Institute of Electrical and Electronics (IEEE) 802.XX suite of protocols, TCP/IP, IPX, SAN, AppleTalk®, Bluetooth®, and other protocols. In general, communication network 115 may include any infrastructure that facilitates communications between the various systems depicted in FIG. 1.

Each of the systems and computing devices in FIG. 1 may include a data processing component (e.g., one or more processors) and one or more memory resources (e.g., volatile and/or non-volatile memory). Processors may include single or multicore processors. Processors may include general purpose microprocessors such as ones provided by Intel®, AMD®, ARM®, Freescale Semiconductor, Inc., and the like, that operate under the control of software stored in associated memory. Memory resources may be provided for storing instructions and/or data associated with an operating system and applications or processes executed by the processors.

Client device 110 can be any computing device configured for initiating an impersonation request and in the manner described herein. For example, client device 110 may be a desktop or laptop running an application (e.g., a Web browser) through which an access request and/or an impersonation request is sent to the AMS 130. Access requests may be sent in response to an explicit request from the user for a particular resource or as a result of some user interaction with the application. Similarly, impersonation requests may be explicit or created through user interaction with the application on the client device.

Applications executed within the network environment 100 may use and/or request access to one or more resources 184. These resources may be distributed and virtualized within network environment 100. For example, the resources 184 may be spread across one or more data centers 180 and can include protected resources and unprotected resources. While only one data center 180 is depicted in FIG. 1 for purposes of simplicity, the network environment 100 may include multiple data centers, possibly in different geographical locations. Each data center may comprise multiple types of resources. The AMS 130 may control the use of and access to these resources. In some embodiments, the data center 180 is a cloud based data center that provides on-demand access to resources. The configuration of data center 180 depicted in FIG. 1 is just an example and is not intended to be limiting.

AMS 130 may include one or more computing devices responsible for performing authentication and authorization in connection with access requests and/or impersonation requests. For example, AMS 130 may include an AM 150 (e.g., a server running Oracle Access Manager software) configured to authenticate a user by comparing one or more user supplied credentials to stored user information. As described below, at least some of the authentication processing may be delegated to IDP 120. Thus, the IDP 120 may perform the comparing of user credentials on behalf of the AM 150.

Some user credentials may be stored in a datastore accessible to the AMS 130 (e.g., a default identity store 160). Other user credentials may be stored in a datastore that is inaccessible to AMS 130. For example, at least some user credentials may be managed by IDP 120. AM 150 may create a session for the user in response to a successful authentication based on one or more user supplied credentials. Session creation may comprise generating session information 170 (e.g., generating a session ID, determining a session validity period, etc.) and associating the session with the user (e.g., by linking the session ID to a username). Session creation may further comprise setting one or more cookies on the client device 110 (e.g., a single sign-on cookie).

AM 150 may provide a single sign-on (SSO) feature that allows the user to log into the AM 150, access a resource from a first provider (e.g., a data center 180), and get access to resources protected or hosted by other providers (e.g., a resource of another data center 180) without requiring the user to re-authenticate. SSO can be implemented through backend communication of encryption keys, secrets, and/or other information between trusted providers participating in an SSO scheme. In response to a request for a resource from another provider (e.g., XYZ.com), the AM 150 may examine an SSO cookie generated for the user (e.g., when the user logged into ABC.com) to determine that the user has a valid session, send the username of the user in a query asking the other provider what types of access rights the user has for the resource, and then provide access to the resource in accordance with a response to the query. The user does not need to be initially authenticated through the AM 150. For example, the user may have initially authenticated by supplying a username and password to a trusted provider (e.g., ABC.com).

AM 150 may be communicatively coupled to a WebGate (WG) 140 configured to intercept requests (e.g., an impersonation request) from the client device 110 and to redirect the requests to the AM 150 for processing. For example an impersonation request may be initiated through the user's web browser, intercepted by WG 140, which determines that the impersonation request is associated with a protected resource, and then redirected to the AM 150 for processing. There may be multiple WGs in communication with the same AM, each WG intercepting requests for a respective resource, e.g., a first WG for requests to access ABC.com and a second WG for requests to access XYZ.com.

IDP 120 may operate one or more identity stores 122 that store user information for users of client devices 110. The user information in identity store 122 can include information by which a user is authenticated (e.g., a username, a password, and/or other credential). Identity store 122 may include one or more directories such as a Lightweight Directory Access Protocol (LDAP) directory. In some embodiments, identity store 122 may include information for users of one or more organizations (e.g., a business organization and its sub-organizations). The user information in identity store 122 may further include impersonation attributes 124. Examples of impersonation attributes include who a particular user is permitted to impersonate, who can impersonate the user, how long a particular user is permitted to impersonate another user, and what resources are accessible for a particular user during an impersonation session. Thus, identity store 22 may include impersonation attributes associated with impersonators as well as impersonation attributes associated with impersonatees.

AM 150 may include a set of components that perform authentication, authorization, and impersonation processing. For example, AM 150 may include an authentication engine 152, an authorization engine 154, a policy manager 156, and an impersonation processor 158. Each of the components 152, 154, 156, and 158 can be implemented in hardware, software, or a combination thereof. For example, impersonation processor 158 can be a software application or module executed by one or more physical processors of AM 150.

The authentication engine 152 may be configured to perform authentication of a user based on a comparison of one or more user supplied credentials to stored user credentials. As mentioned earlier, credentials can be stored in the default identity store 160 and/or the identity store 122. In certain embodiments, at least some of the authentication processing is delegated to the IDP 120, e.g., authentication processing for users whose information is stored in identity store 122. Accordingly, the authentication engine 152 may send an authentication request to IDP 120. In turn, IDP 120 may verify one or more user supplied credentials to send a response back to the authentication engine 152 indicating whether or not the user was successfully authenticated. In such instances, although the AM 150 does not directly perform the authentication, from the perspective of the WG 140, the AM 150 is still the entity responsible for protecting the resource.

In certain embodiments, when a request requiring authentication (e.g., an impersonation request) is received by AMS 130, the AM 150 may delegate the authentication to IDP 120, e.g., in the form of a Security Assertion Markup Language (SAML) request. The IDP 120 may generate an login screen for the user to submit one or more credentials, authenticate the user based on the credentials, and send the user's attributes to the AM 150 (e.g., in a SAML response indicating whether the user has access or not). IDP 120 may send the user attributes to AM 150 without sending the user's credentials. In this manner, the AM 150 can determine what rights the user has to access a resource or to impersonate, but the AM 150 may not have access to the user's credentials (e.g., the user's password).

The authorization engine 154 may be configured to perform authorization including, for example, looking up an authorization policy applicable to a resource being requested and determining whether the authorization policy permits a user to access the requested resource. The authorization engine 154 may further be configured to start an impersonation session in response to receiving an indication from the impersonation processor 158 that the requirements for starting the impersonation session have been satisfied. As explained below, the authorization engine 154 may be responsible for switching the user associated with a current session. In particular, the current session may be a session established for the impersonator. To start the impersonation session, the authorization engine 154 can switch the user associated with the current session to the impersonatee. This enables the impersonator to assume the identity of the impersonatee for the duration of the session, which has now been converted into an impersonation session.

Figure 4:
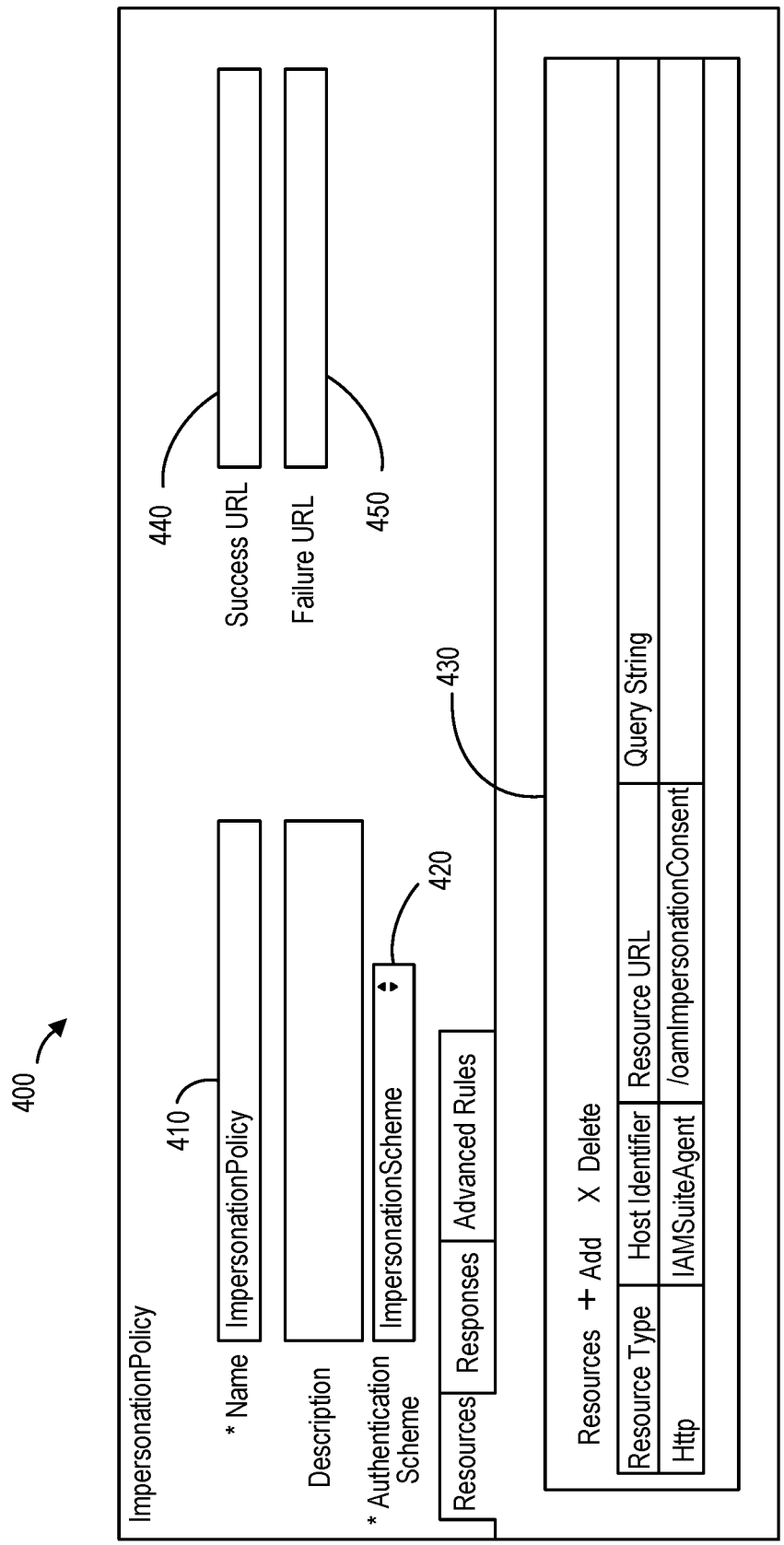
FIG. 4 shows a user interface for configuring an impersonation policy, in accordance with an embodiment of the present disclosure.
Figure 5:
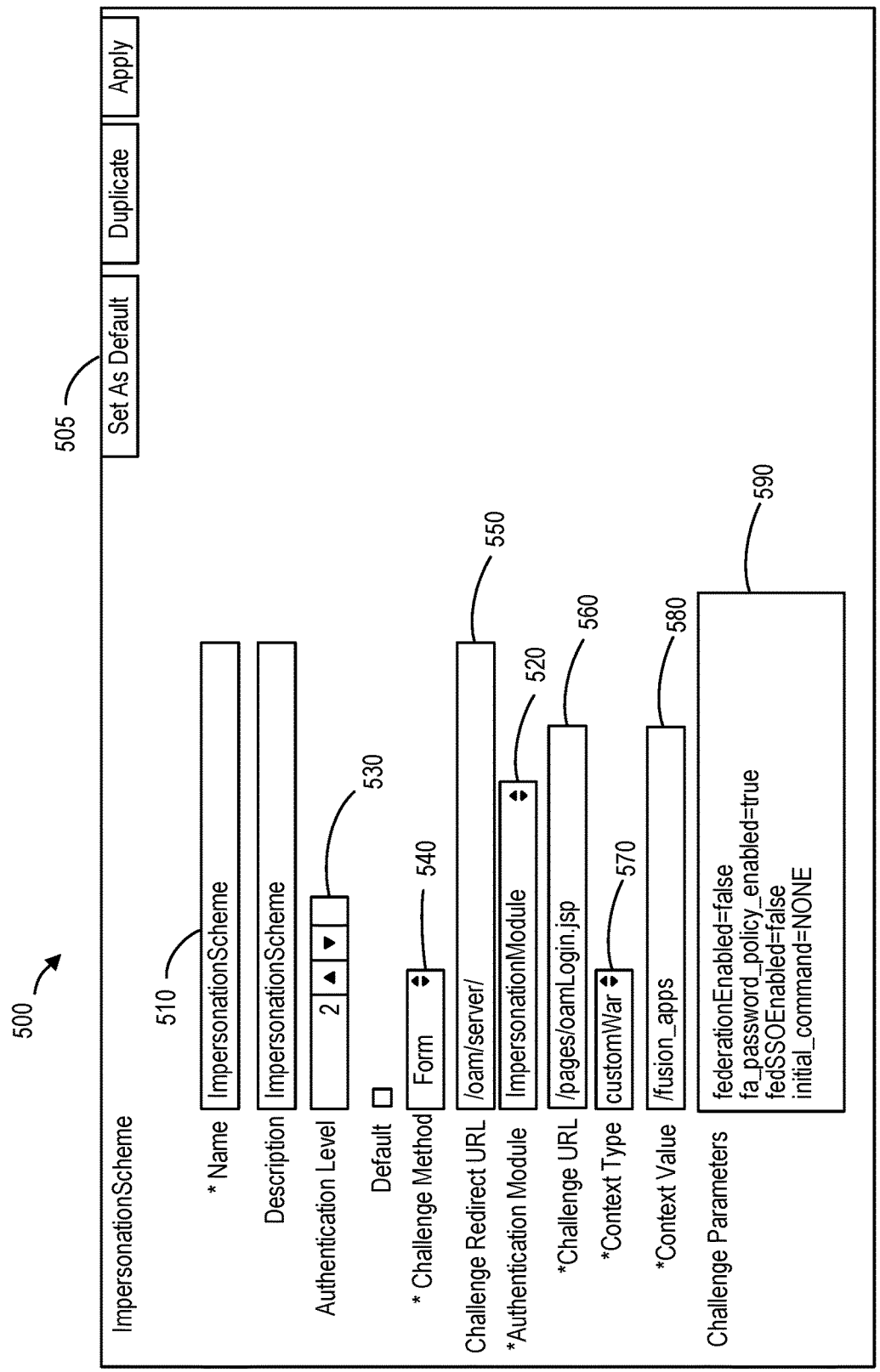
FIG. 5 shows a user interface for configuring an impersonation scheme, in accordance with an embodiment of the present disclosure.

The policy manager 156 may be configured to manage a set of policies that control access to resources within network environment 100. For example, policy manager 156 may have access to various security related policies such as authentication policies, authorization policies, consent policies, and impersonation policies. Consent policies may specify what types of information are presented to a user in connection with requesting the user's consent to begin an impersonation session. For example, a consent policy can specify that a particular consent page be presented to the user for confirming the user's intent to start an impersonation session. Impersonation policies can be used to determine which IDP to use for authenticating the user. In an embodiment with multiple IDPs, a separate impersonation policy can be defined for each IDP. Impersonation policies can also be used to specify what types of authentication are required for an impersonation request. For example, as depicted in FIGS. 4 and 5, an impersonation policy can be associated with an impersonation scheme configured with various authentication parameters.

The impersonation processor 158 may be configured to, based on an impersonation policy, communicate with a particular IDP (e.g., IDP 120) in connection with impersonation processing. For example, impersonation processor 158 may request impersonation attributes from the IDP 120 and process the impersonation attributes to configure an impersonation session. Impersonation processor 158 may further be configured to process a consent policy, e.g., in order to present a consent page requesting confirmation from the user that the impersonation session should be started.

Whether or not consent is required may be a setting configurable by a resource provider. In certain embodiments, consent pages are defined based on a consent policy and an impersonation policy managed by the policy manager 156. Different consent pages can be defined for different resource providers. Consent processing may involve re-authenticating the user. For example, a consent page may require the user to re-enter the user's password, which the impersonation processor 158 then sends to the IDP 120 for performing a second authentication of the user. Some consent pages may have one or more fields pre-populated. For example, a username may be filled in automatically using the same username supplied earlier in connection with the initial authentication of the user. Other consent pages may show a field for entering a password without showing a field for the username. The consent page operates as a security mechanism for confirming that the user wants to impersonate, thereby preventing misuse of an impersonation grant.

In certain embodiments, impersonation processor 158 may be implemented using a plugin (e.g., a plugin for Oracle Access Manager). The impersonation plugin may be implemented in software and can be considered an extension of the core functionality of the AM 150. The impersonation plugin may operate in a similar manner to an authentication plugin that generates authentication requests to an appropriate IDP based on information about the requested resource. Plugins can be loaded and unloaded at runtime and can define specific authentication behavior for a particular resource. When the WG 140 intercepts an access request, the policy manager 156 may determine which authentication policy is protecting the resource in order to invoke the appropriate authentication plugin. An authentication plugin may define authentication behavior that is customized for a resource provider. For example, if a resource provider wants the user to enter a password twice to authenticate, the requirement for entering the password twice can be specified through an authentication plugin. Similarly, when an impersonation request is received by the AM 150, the AM may invoke an appropriate impersonation plugin that constructs a request to go to a particular federation end point (e.g., IDP 120) in order to obtain information indicating whether the user has permission to impersonate the impersonatee.

To start the impersonation session, impersonation processor 158 may signal the authorization engine 154 to trigger a switch from the impersonator to the impersonatee. The user associated with the current session (i.e., the impersonator) may be identified in a cookie that was generated when the user was authenticated earlier. The authorization engine 154 can perform the switch in the backend by the updating the cookie to identify the impersonatee. The updating of the cookie may involve replacing information about the impersonator (e.g., a username or other user identifier) with information about the impersonatee. In this manner, the session is converted into an impersonation session that is treated like a regular session started by the impersonatee.

The AM 150 may define certain start points and end points, e.g., a logout end point for ending a regular session. Similarly there may be an impersonation start point and an impersonation end point. To start an impersonation session, the user may, for example, open an impersonation start URL (uniform resource locator) to trigger the impersonation request. The AM 150 may treat the impersonation start URL like a resource, mapping the impersonation start URL to an impersonation policy, which in turn maps to the appropriate impersonation plugin. To end an impersonation session, the user may open an impersonation end URL. Impersonation can also end automatically when the grant time expires. When impersonation ends, the authorization engine 154 may switch the user back to the impersonator. The switch back to the impersonator need not invoke the impersonation processor 158, and the impersonator need not re-authenticate because the impersonator has already been authenticated earlier.

Figure 2:
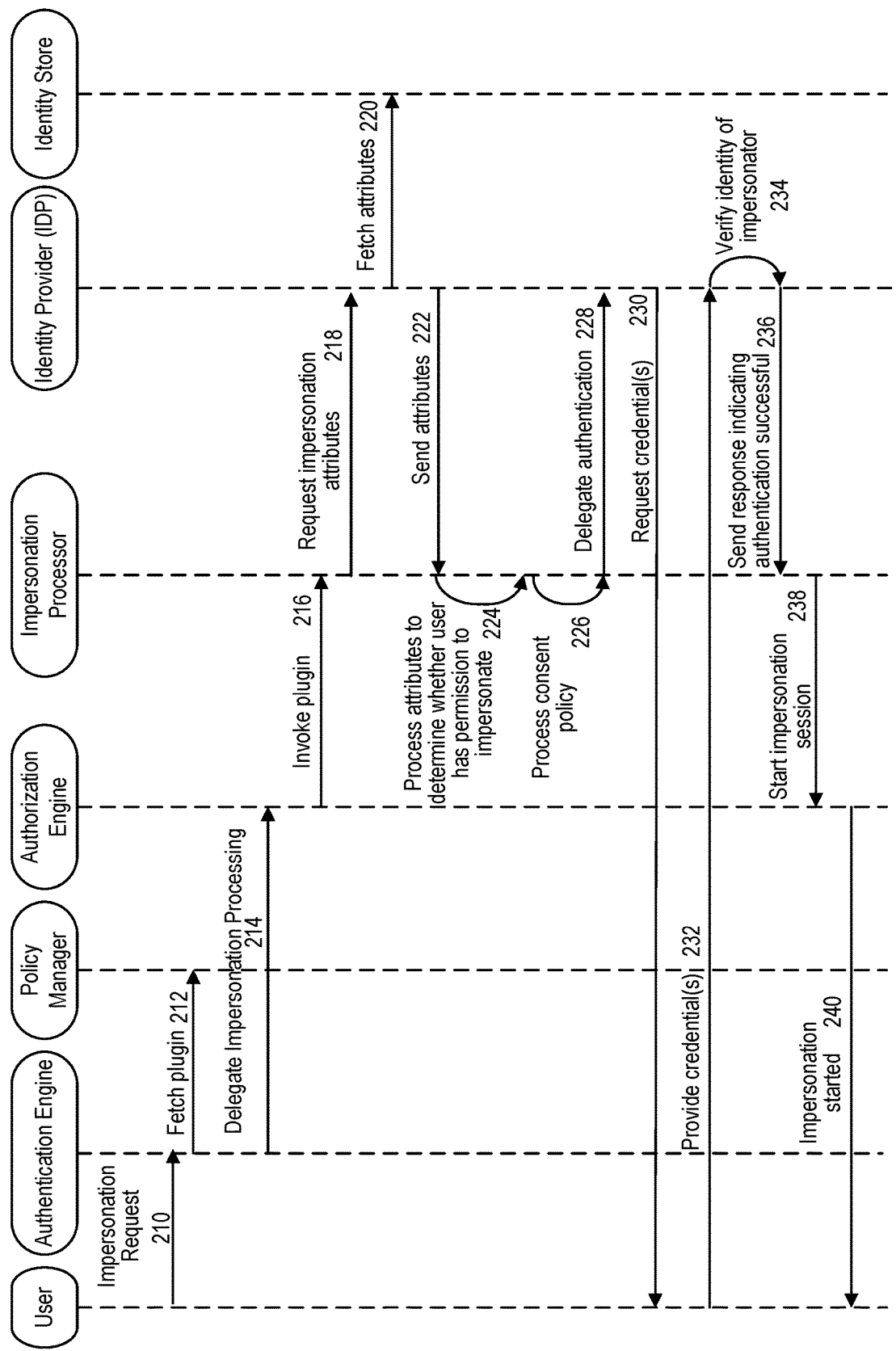
FIG. 2 is a simplified process diagram of a process 200 for handling an impersonation request, in accordance with an embodiment of the present disclosure.
Figure 3:
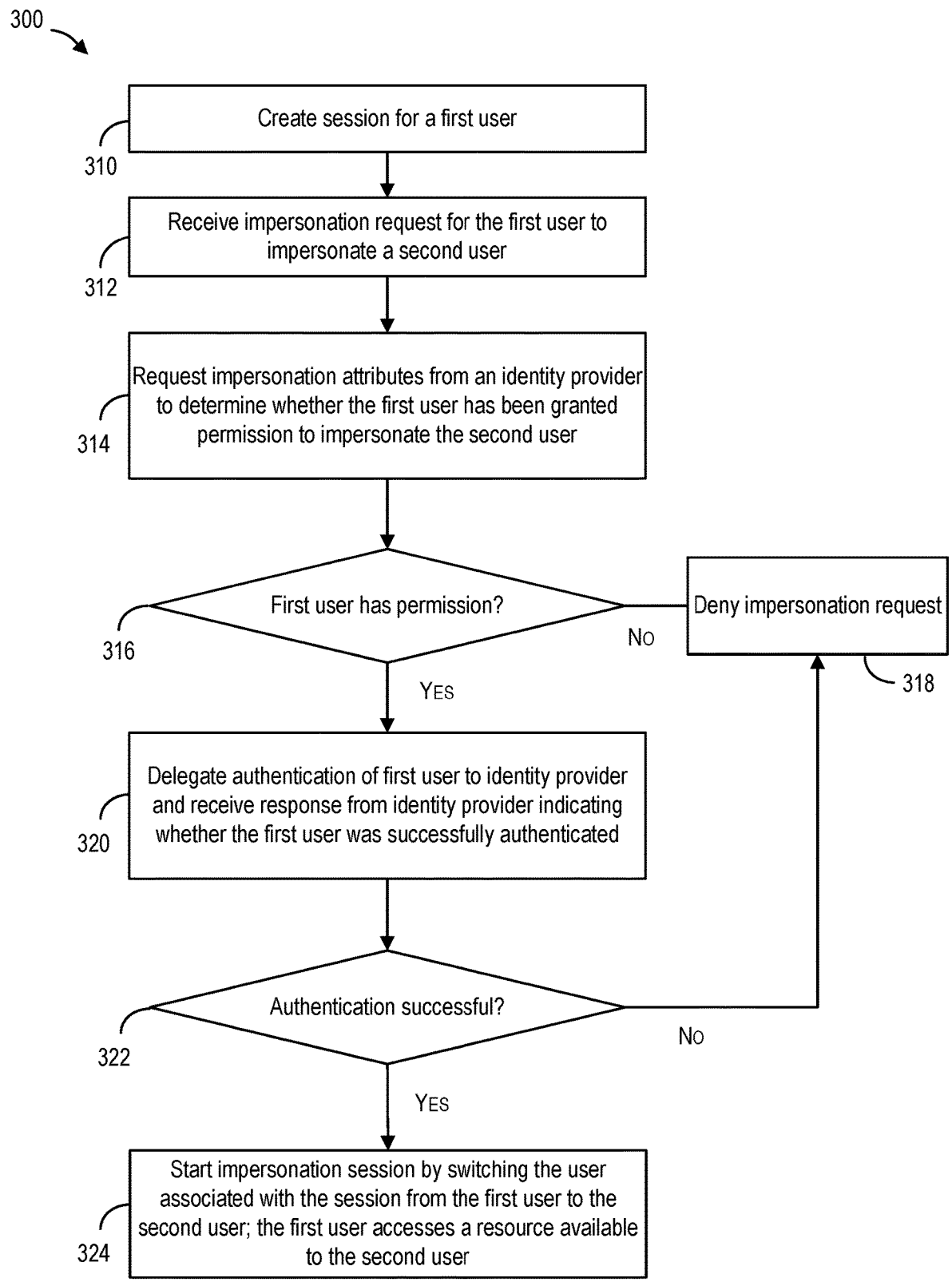
FIG. 3 is a simplified flowchart of a method for starting an impersonation session, in accordance with an embodiment of the present disclosure.

Example flowcharts and process diagrams depicting processing performed during handling of an impersonation request will now be described in connection with FIGS. 2 and 3. The processing depicted in FIGS. 2 and 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). Although FIGS. 2 and 3 depict various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIGS. 2 and 3 may be performed by one or more components of an AMS (e.g., WG 140 and/or AM 150) in conjunction with processing performed by an IDP (e.g., IDP 120).

FIG. 2 is a simplified process diagram of a process 200 for handling an impersonation request, in accordance with an embodiment of the present disclosure. As depicted in FIG. 2, the process 200 can be performed by various components of an AMS including an authentication engine (e.g., authentication engine 152), a policy manager (e.g., policy manager 156), an authorization engine (e.g., authorization engine 154), and an impersonation processor (e.g., impersonation processor 158). Various processing steps are also performed by a user who initiates an impersonation request (e.g., a user of a client device 110) and an IDP (e.g., IDP 120).

The process 200 includes steps for determining whether the user has been granted permission to impersonate, and may begin an impersonation request from the user. The processing depicted in FIG. 2 assumes that the user has been previously authenticated (e.g., through user input of credentials such as a username and password) to establish a regular (i.e., non-impersonation) session for the user. However, in certain embodiments, the user may start a regular session in conjunction with an impersonation request, e.g., by supplying the username and password at the same time as triggering or sending the impersonation request.

At step 210, the authentication engine receives the impersonation request from the user. The impersonation request can be received, for example, by WG 140 in response to the user opening an impersonation start URL. The impersonation request may identify a particular impersonatee that the user wishes to impersonate. For example, the impersonation request may include a username of the impersonatee. The impersonation request is forwarded to an AM (e.g., AM 150) for processing by the authentication engine of the AM.

At step 212, the authentication engine contacts the policy manager to fetch an impersonation plugin based on a policy mapping. The mapping may comprise information associating the impersonation start URL to the impersonation policy. In turn, each impersonation policy may be associated with a corresponding impersonation plugin. In this manner, an appropriate impersonation plugin can be fetched for the impersonation request based on a URL associated with the impersonation request.

At step 214, the authentication engine delegates impersonation processing to the authorization engine. The delegation may involve the authentication engine indicating to the authorization engine which impersonation plugin was fetched in step 212.

At step 216, the authorization engine invokes the impersonation plugin that was fetched in step 212 to initiate plugin processing. The invoking of the impersonation plugin may involve instantiating the plugin and allocating a set of computing resources (e.g., memory) used by the plugin during execution of plugin processing.

At step 218, the impersonation processor (e.g., one or more processors executing the impersonation plugin that was invoked in step 216) requests impersonation attributes from a particular IDP (e.g., IDP 120). The impersonation plugin may identify the IDP based on an impersonation policy that the impersonation plugin is configured to use. In this manner, the impersonation plugin is mapped to the IDP through the impersonation policy. Different impersonation plugins can map to different identity providers. Thus, which IDP is contacted to request impersonation attributes may depend on the plugin that was fetched in step 212. The impersonation attributes include user attributes configured for the user from whom the impersonation request was received. For example, the impersonation attributes may indicate who the user is permitted to impersonate and a time period during which the user is permitted to impersonate (e.g., a general time period or for time period associated with a particular impersonatee).

At step 220, the IDP fetches the impersonation attributes from an identity store that the IDP has access to, but the AM does not (e.g., identity store 122).

At step 222, the IDP sends the impersonation attributes that were fetched in step 220 to the impersonation processor.

At step 224, the impersonation processor processes the impersonation attributes to determine whether the user has permission to impersonate. The processing in step 224 may involve, for example, determining whether the attributes indicate that the impersonatee identified in the impersonation request has given permission for the user to impersonate the impersonatee, and whether the current time is within a time period in which the user is permitted to impersonate. If the impersonation processor determines that the user has permission, the process proceeds to step 226. Otherwise, the impersonation processor may generate a response indicating that the impersonation request is denied.

At step 226, the impersonation processor processes a consent policy which may, for example, specify a particular consent page to present to the user for confirming a desire to start an impersonation session. Similar to the impersonation policy, the consent policy can be associated with the impersonation start URL, with different consent policies being defined for different impersonation start URLs. Thus, the consent page may vary depending on which URL was used to initiate the impersonation request in step 210. If the user confirms their desire to start the impersonation session, the process proceeds to step 228. Otherwise, the impersonation processor cancels the impersonation request.

At step 228, the impersonation processor delegates responsibility for authenticating the user to the IDP because the AM does not have access to the identity store. Thus, the authentication of the user in connection with the impersonation request is handled by the IDP on behalf of the AM. As explained below in connection with steps 230 and 232, the user can provide their credentials to the IDP without having to send the credentials to the AM. Alternatively, in some embodiments, the AM may receive and forward the user credentials to the IDP for authentication.

At step 230, the IDP begins re-authenticating the user. As explained earlier, the user may have already been authenticated prior to the impersonation request. The re-authentication is performed as a security measure for ensuring that the user is in fact the same user for whom the session was created and not, for example, a different person who somehow obtained access to the user's device after the session was created. The re-authentication begins with the IDP sending a request to the user's device for the user to supply one or more credentials. The requested credentials do not necessarily have to be the same credentials by which the user was previously authenticated. In some embodiments, the requested credentials are a subset of the previous credentials. For example, the IDP may only request the user's password instead of both the user's username and password.

The requested credential(s) can be submitted through a login screen of the consent page from step 226. In some embodiments, the impersonation processor may generate the consent page to obtain and forward the credentials to the IDP. Alternatively, the consent page may be generated by the IDP in accordance with the consent policy. For example, the delegation of authentication in step 228 may involve the impersonation processor sending the consent page or information for generating the consent page to the IDP so that the IDP can present the consent page to the user's device in step 230.

At step 232, the user provides the requested credential(s). Various credential collection mechanisms can be used to collect the requested credential(s), such as Hypertext Transfer Protocol (HTTP), Open Authorization (OAuth), Basic Authentication (which is an authentication scheme built into HTTP), etc.

At step 234, the IDP verifies the identity of the user by re-authenticating the user based on the credential(s) provided in step 232, and sends a response to the impersonation processor indicating whether the re-authentication was successful. If the re-authentication was unsuccessful, the impersonation plugin may generate a response indicating that the impersonation request is denied. Otherwise, the process proceeds to step 238.

At step 238, the impersonation processor instructs the authorization engine to start impersonation. As part of this instruction, the impersonation plugin may send the impersonation attributes to the authorization engine to enable the authorization engine to configure the impersonation session according to the impersonation attributes.

At step 240, the authorization engine starts the impersonation session by switching users from the user who sent the impersonation request (i.e., the impersonator) to the user being impersonated (i.e., the impersonatee), thereby converting the current user session into an impersonation session.

FIG. 3 is a simplified flowchart of a method 300 for starting an impersonation session, in accordance with an embodiment of the present disclosure. The method 300 can be performed by an access management system (e.g., AMS 130) and begins at step 310 with creating a session for a first user. The session may be created in various ways, including through an initial authentication of the first user in connection with a request from the first user for access to a resource protected by the AMS.

At step 312, an impersonation request is received from the first user during the session created in step 310. The impersonation request is a request for the first user to impersonate a second user and may include, for example, a username or other identifier associated with the second user.

At step 314, impersonation attributes are requested from an identity provider that has access to the impersonation attributes. The impersonation attributes comprise information indicating whether the first user has been granted permission to impersonate the second user. As explained earlier, the identity provider can be determined based on an impersonation policy applicable to the impersonation request (e.g., an impersonation policy associated with a URL used to initiate the impersonation request).

At step 316, the AMS determines, based on the impersonation attributes provided by the identity provider, whether the first user has permission to impersonate the second user. If the first user does not have permission, the method proceeds to step 318. Otherwise the method proceeds to step 320.

At step 318, the impersonation request is denied. The AMS may send a message to the client device of the first user indicating that the request was denied, possibly with an indication of a reason for the denial (e.g., the second user has not granted permission to the first user, the time period in which the first user is permitted to impersonate has passed or is yet to occur, etc.).

At step 320, the AMS delegates authentication of the first user to the identity provider and the identity provider attempts to verify the identity of the first user based on one or more credentials supplied by the first user. The credentials may be supplied from the user's device to the identity provider without going through the AMS. Alternatively, as discussed earlier, the AMS can receive the user's credentials (e.g., through a consent page) and forward the credentials to the identity provider for verification.

At step 322, the AMS determines, based on a response generated by the identity provider after processing of the user's credentials, whether the authentication was successful. If the response indicates that the authentication was unsuccessful, the method proceeds to step 318, where the impersonation request is denied. The denial may including sending the user an indication that the request was denied based on a failure to successfully authenticate. If the response indicates that authentication was successful, the method proceeds to step 324.

At step 324, an impersonation session is started by switching the user associated with the session created in step 310 from the first user to the second user. The first user can thereafter interact with the AMS using the identity of the second user. For example, the first user may access a resource available to the second user (e.g., a resource that the second user has access to, but the first user does not). Although the first user has assumed the identity of the second user, the first user may not have identical access privileges as the second user. For example, the first user may have been granted a subset of the second user's access privileges. The access privileges that the first user has during the impersonation session may be specified in the impersonation attributes that were requested in step 314.

Figure 6:
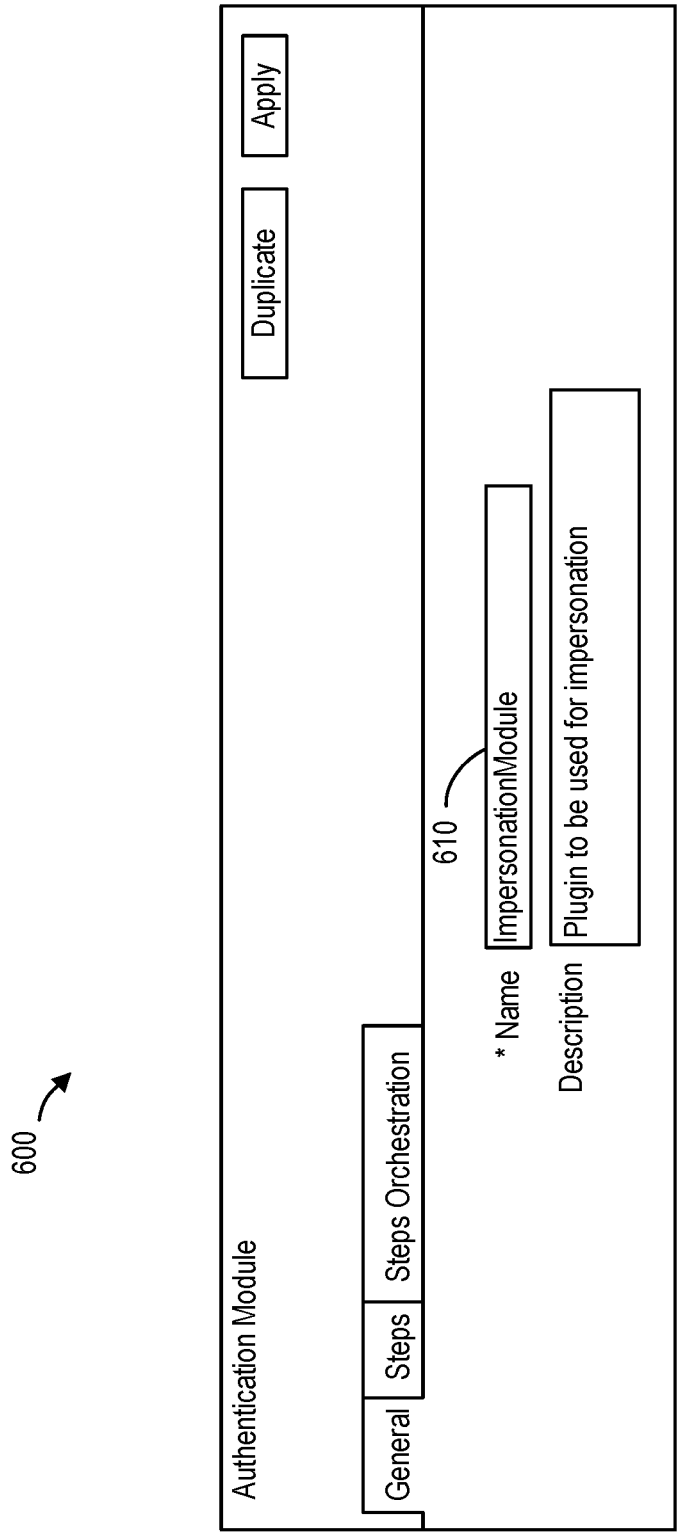
FIG. 6 shows a user interface for configuring an impersonation module, in accordance with an embodiment of the present disclosure.

FIGS. 4 to 6 depict example graphical user interfaces for configuring settings that govern processing of an impersonation request. In particular, the user interfaces in FIGS. 4 to 6 enable an administrator (e.g., an operator of AMS 130 or data center 180) to configure impersonation policies, impersonation schemes, and impersonation plugins using functionality provided by Oracle Access Manager software with respect to configuration of authentication processing. FIGS. 4 to 6 are merely intended to show various ways in which certain aspects of impersonation processing can be configured in accordance with certain embodiments. The user interfaces depicted in FIGS. 4 to 6 may be applied to configure information used by an AMS during processing of an impersonation request. For example, the user interfaces in FIGS. 4 to 6 can be used to specify a consent page that presents a user interface for obtaining a user credential in connection with authentication during processing of an impersonation request, specify a particular identity provider to contact for authenticating an impersonator, and to specify the level of authentication required to begin impersonation.

FIG. 4 shows a user interface 400 for configuring an impersonation policy 410 named "ImpersonationPolicy." The impersonation policy 410 can be configured in a manner similar to an authentication policy. Thus, the impersonation policy can be considered to be a specially configured authentication policy. Authentication policies may define the types of verification that must be performed to provide a sufficient level of trust for the AM to grant access to a user making a request to access a resource. Similarly, an impersonation policy may define the types of verification that must be performed to provide a sufficient level of trust for the AM to grant permission to impersonate. An impersonation policy can be defined to protect one or more resources. For example, an impersonation policy can be associated with an instance of an impersonation plugin that defines the impersonation behavior for a particular application provided by a resource provider (e.g., an application running in a data center 180).

As shown in FIG. 4, the user interface 400 includes a menu 420 for associating the impersonation policy 410 with an impersonation scheme named "ImpersonationScheme" and a menu 430 for associated the impersonation policy 410 with one or more resources. The impersonation scheme can be configured using the user interface shown in FIG. 5. The resource can be associated with a resource type (e.g., an HTTP resource), a host identifier (e.g., a WebGate configured as an Identity and Access Management (IAM) Suite Agent), and a resource URL (e.g., an impersonation start URL "/oamImpersonationConsent" that can be opened to initiate an impersonation request). Although only one resource is shown, the impersonation policy 410 can be associated with multiple resources. The user interface 400 further includes a field 440 for associating the impersonation policy 410 with a success URL to which the user is directed upon grant of the impersonation request, and a field 450 for associating the impersonation policy 410 with a failure URL to which the user is directed upon denial of the impersonation request.

In FIG. 4, the impersonation start URL/oamImpersonationConsent is mapped to the impersonation policy 410, which is associated with the impersonation scheme specified in menu 420. As shown in FIG. 5, an impersonation scheme can be associated with an impersonation module. In FIG. 6, an impersonation module is configured as an impersonation plugin responsible for communicating with an identity provider. Thus, the impersonation policy 410 may be used to identity an associated impersonation scheme, which is in turn used to invoke an associated impersonation plugin for communicating with an appropriate identity provider.

FIG. 5 shows a user interface 500 for configuring an impersonation scheme 510, which can be configured in a manner similar to an authentication scheme. An authentication scheme defines the challenge mechanism required to authenticate a user. Likewise, an impersonation scheme can also be associated with a challenge mechanism. Additionally, each impersonation scheme may be associated with an impersonation module. Thus, the user interface 500 includes a menu 520 for associating the impersonation scheme 510 with an impersonation module (e.g., the module configured in FIG. 6). The user interface 500 may further include an option 505 to set the impersonation scheme 510 as a default impersonation scheme (e.g., the default scheme for an associated impersonation policy). However, different impersonation schemes can be defined and an impersonation policy can be associated with one of several impersonation schemes (e.g., an impersonation scheme customized for a particular resource provider).

Additionally, the user interface 500 may include a menu 530 for assigning the impersonation scheme 510 an authentication level, a menu 540 for specifying a challenge method (e.g., Forms, Basic Authentication, or Digest authentication), a field 550 for specifying a challenge redirect URL (e.g., "/oam/server/"), a field 560 for specifying a challenge URL (e.g., a "/page/oamLogin.jsp"), a menu 570 for specifying a context type (e.g., "customWar," which indicates that the associated consent page has been defined as a Web Application Resource (WAR) file), a field 580 for specifying a context value (e.g., a URL corresponding to the WAR file's root path), and a field 590 for specifying one or more challenge parameters (e.g., parameters indicating whether federation is enabled, whether a password policy is enabled, and whether single sign-on is enabled).

The challenge redirect URL specified in field 550 is a URL associated with a particular IDP. Therefore, an IDP can be associated with a particular impersonation policy (e.g., impersonation policy 410) through configuring the challenge redirect URL for an impersonation scheme (e.g., impersonation scheme 510) and associating the impersonation scheme with the impersonation policy.

The challenge URL specified in field 560 is a URL associated with a particular consent page (e.g., a consent page that has been customized for the IDP assigned to impersonation scheme 500). The challenge URL can be used together with the context value specified in field 580 to retrieve a particular consent page.

The authentication level specified in menu 530 indicates what level of authentication is required before an impersonation session is allowed to start. In certain embodiments, the impersonation module/plugin may check the current authentication level of a user and compare the current authentication level to the required authentication level to determine whether the user is allowed to start the impersonation session. For example, if the user has been authentication using single factor authentication, the current authentication level could be determined to be insufficient when compared to a required authentication level associated with multi-factor authentication. In this scenario, the user may be requested to re-authenticate using multi-factor authentication before the impersonation session is allowed to start.

FIG. 6 shows a user interface 600 for configuring an impersonation module 610 in a manner similar to an authentication module. The impersonation module 610 is an instantiation of an impersonation plugin. A separate impersonation module 610 can be configured for each IDP in the network environment.

Figure 7:
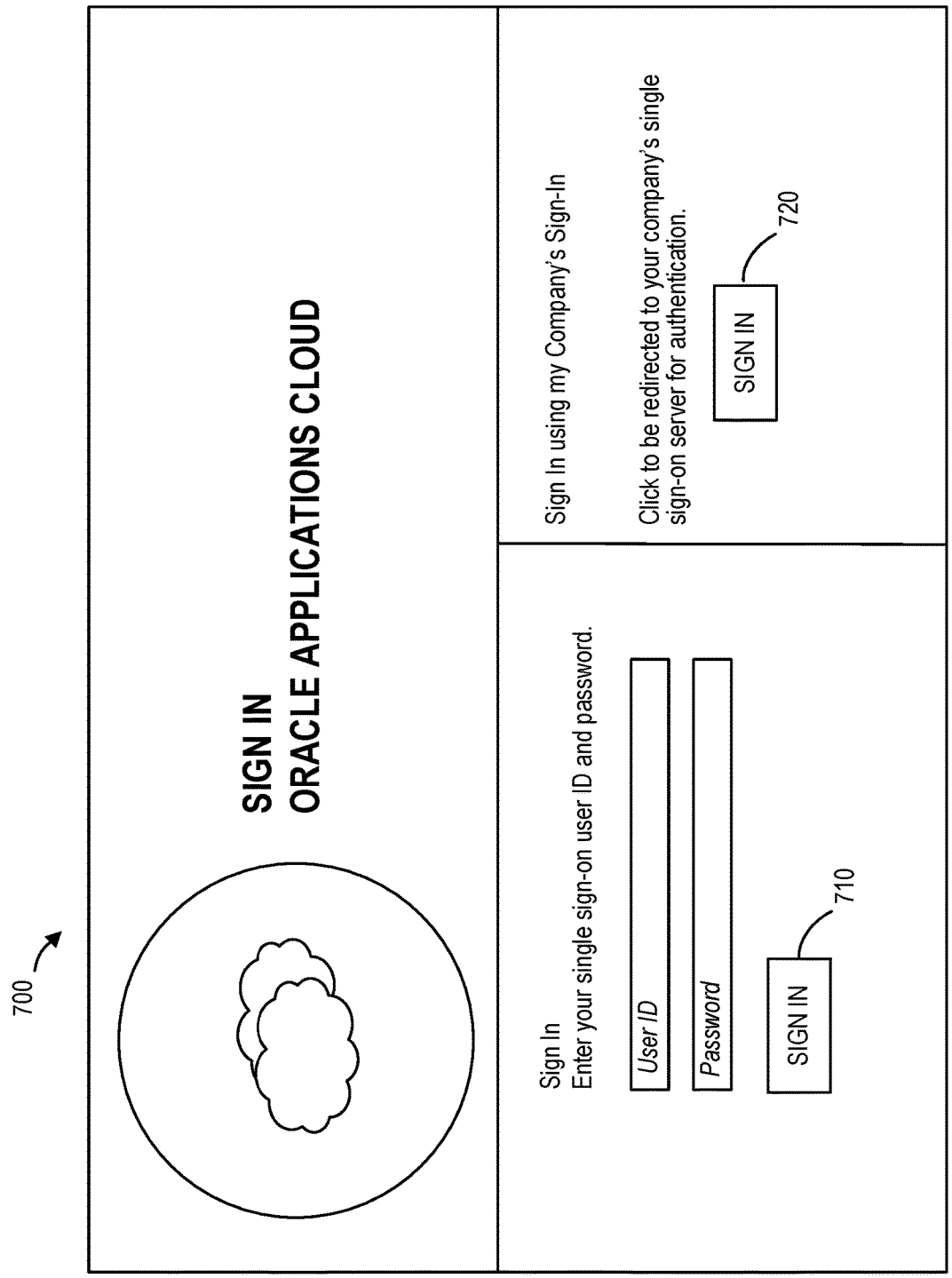
FIG. 7 shows a user interface for supplying credentials prior to initiating an impersonation request, in accordance with an embodiment of the present disclosure.
Figure 8:
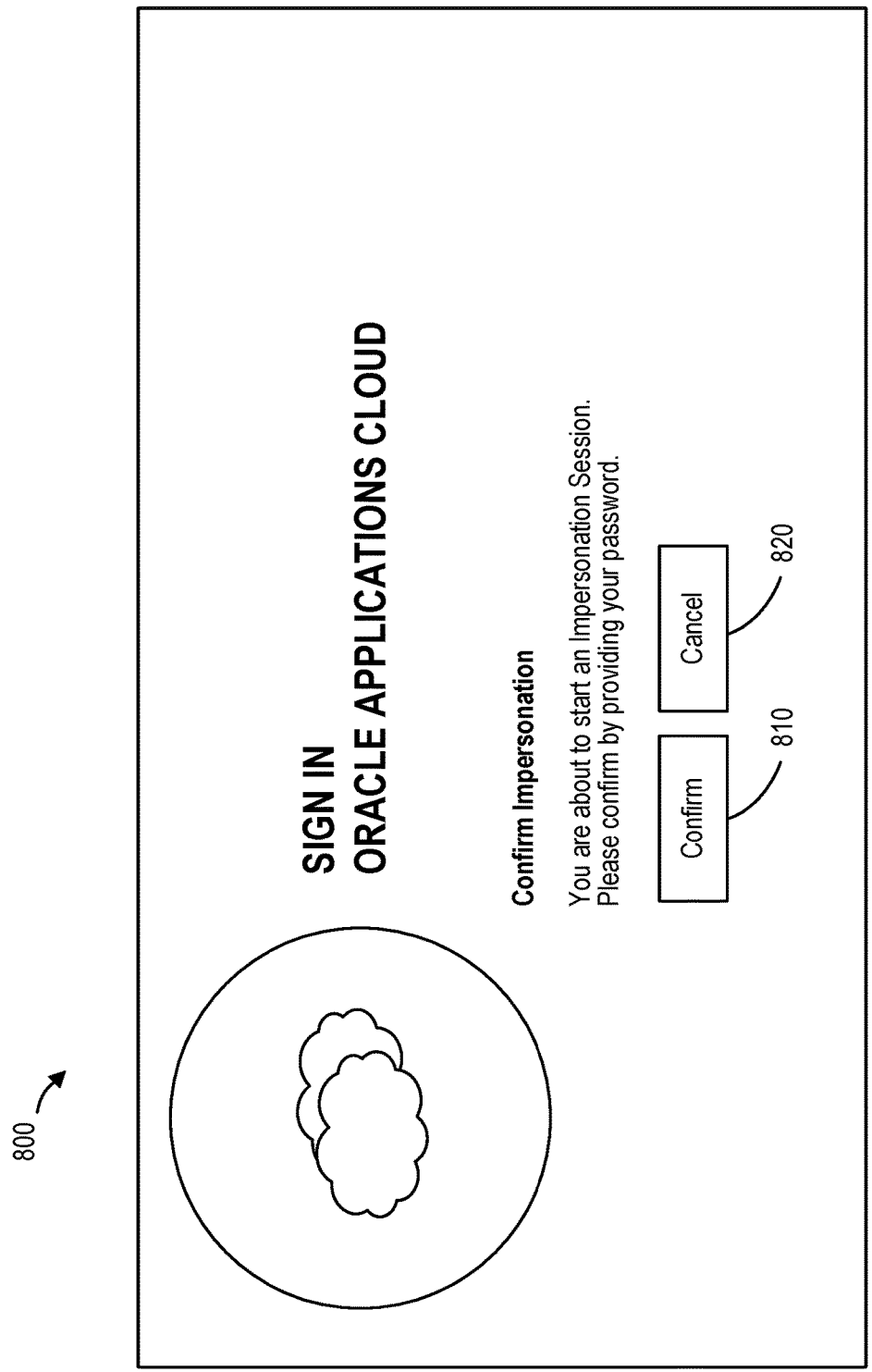
FIG. 8 shows a user interface for confirming a start of an impersonation session, in accordance with an embodiment of the present disclosure.
Figure 9:
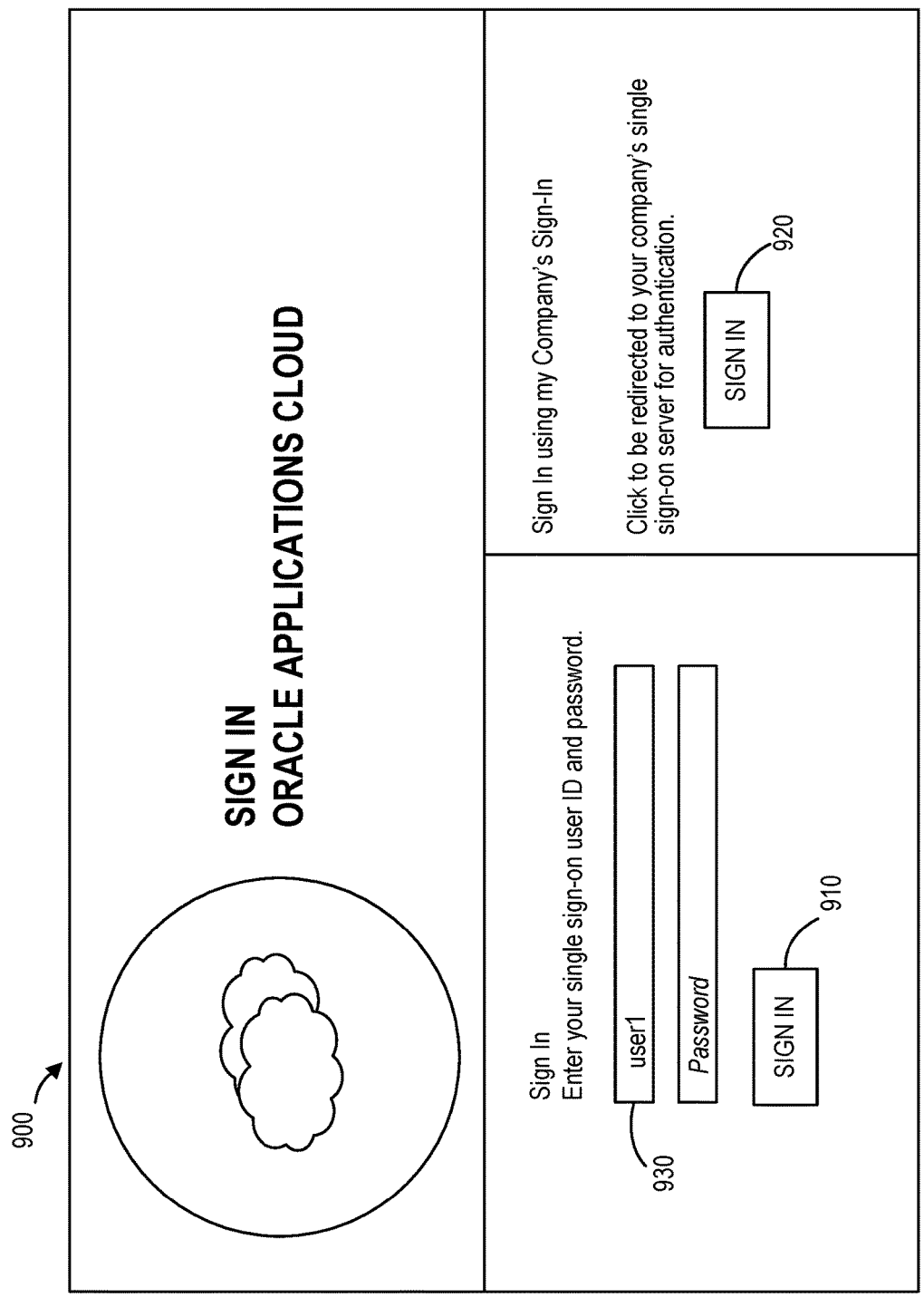
FIG. 9 shows a user interface for supplying credentials in connection with confirming a start of an impersonation session, in accordance with an embodiment of the present disclosure.

FIGS. 7 to 9 depict example graphical user interfaces that can be presented to an impersonator during processing of an impersonation request, in accordance with certain embodiments. FIG. 7 shows a user interface 700 for requesting user credentials prior to initiating an impersonation request. The user interface 700 can be used to, for example, establish a regular session that can subsequently be converted into an impersonation session. The user interface 700 presents an option 710 to sign in using a single sign-on user ID and password. Alternatively, the user can sign in using a company sign-in by selecting an option 720 that redirects the user to a company single sign-on server for authentication.

FIG. 8 shows a user interface 800 for confirming a start of an impersonation session. The user interface 800 may correspond to the initial screen of a consent page and presents an option 810 for confirming that the user wishes to start an impersonation session and an option 820 for canceling the impersonation request. The user interface 800 also informs the user that the user's password will be needed to confirm the start of the impersonation session.

FIG. 9 shows a user interface 900 for supplying credentials in connection with authentication for starting an impersonation session. The user interface in FIG. 9 may be presented to the user in response to user selection of the option 810 in FIG. 8. The user interface 900 is similar to the user interface 700 in FIG. 7 and includes an option 910 to sign in using a single sign-on user ID and password and an option 920 to sign in through a company single sign-on server. However, a user ID field 930 has been pre-populated with a user ID "user1" that was supplied when the user was authenticated earlier (e.g., a user ID supplied when signing in through the user interface 700). If the user selects option 920, the company single sign-on server performs the authentication. However, if the user selects option 910, the IDP to which the impersonation policy is mapped (e.g., impersonation scheme 510 in FIG. 5) handles the authentication.

Figure 10:
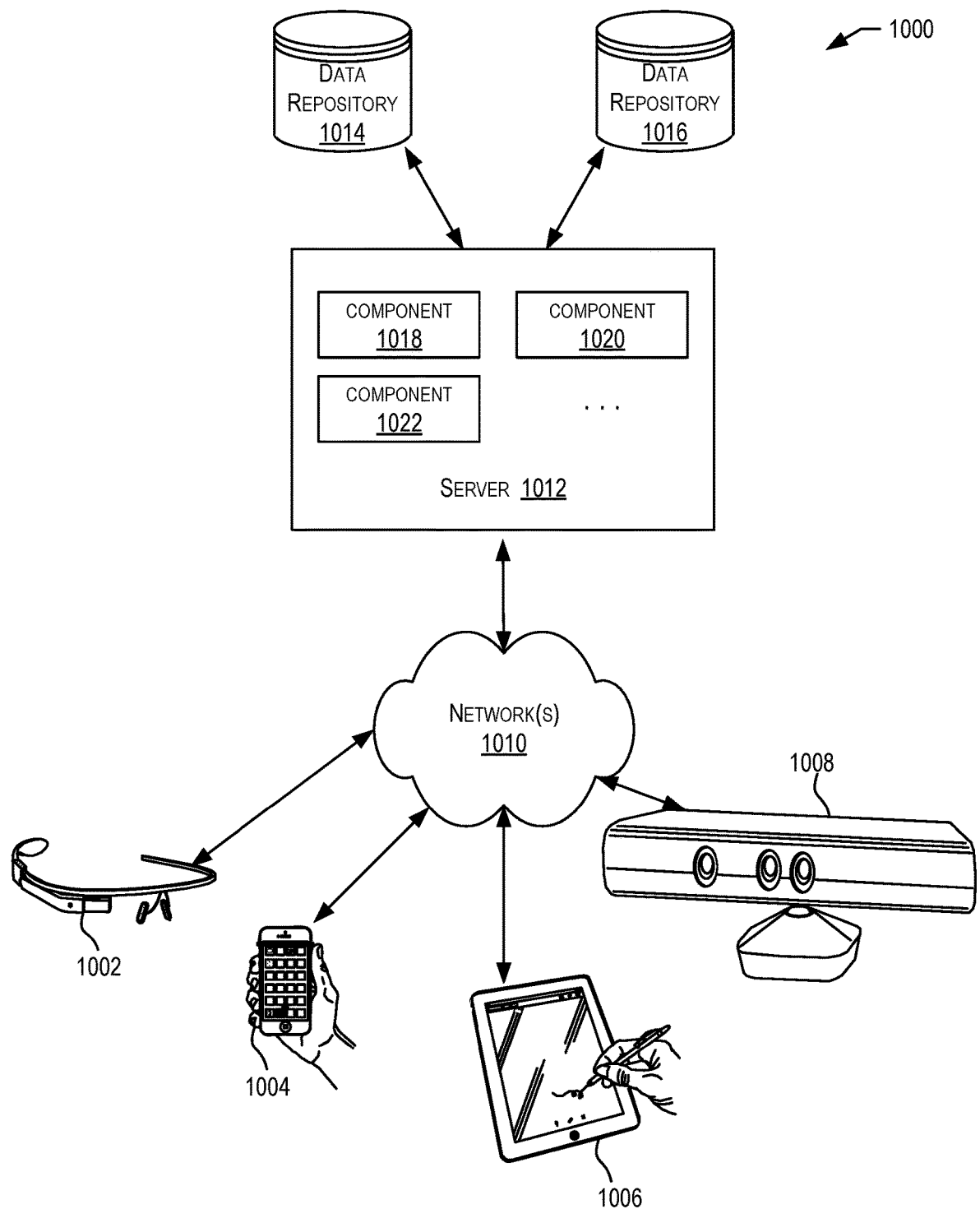
FIG. 10 is a simplified diagram of a distributed system for implementing one or more embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system, including services or applications that enable configuration of impersonation attributes and processing of impersonation requests.

In certain embodiments, server 1012 may also provide other services or software applications that can include non-virtual and virtual environments. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Users may use client computing devices 1 002, 1004, 1006, and/or 1008 to initiate an impersonation request in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization such as one or more flexible pools of logical storage devices that can be virtualized to maintain virtual storage devices for the server. In various embodiments, server 1012 may be adapted to run one or more services or software applications that provide the functionality described in the foregoing disclosure. For example, server 1012 may correspond to a server for performing processing of an impersonation request according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014 and 1016. These data repositories may be used to store data and other information in certain embodiments. For example, one or more of the data repositories 1014, 1016 may be used to store information used to process an impersonation request including, for example, impersonation attributes, impersonation policies, and consent page information. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
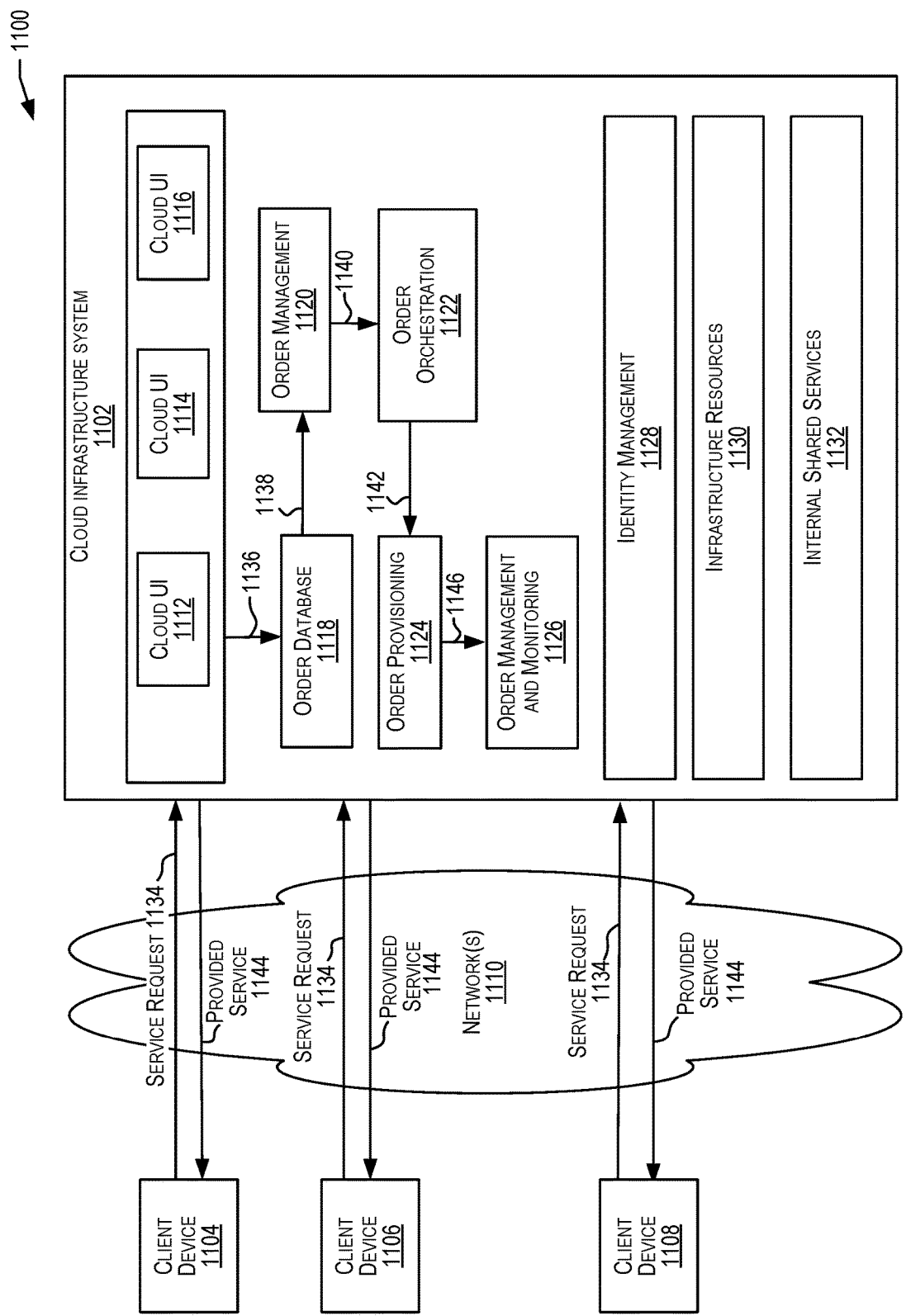
FIG. 11 is a simplified block diagram of a system environment by which impersonation-related services may be offered as cloud services, in accordance with certain embodiments.

In certain embodiments, the impersonation-related functionalities described in this disclosure may be offered as services via a cloud environment. FIG. 11 is a simplified block diagram of a system environment 1100 by which various impersonation-related services may be offered as cloud services, in accordance with certain embodiments. In the embodiment depicted in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010. The networks may be of the same or different types. Network(s) 1110 may support one or more communication protocols, including wired and/or wireless protocols, for facilitating the communications.

The embodiment depicted in FIG. 11 is only one example of a cloud infrastructure system and is not intended to be limiting. It should be appreciated that, in some other embodiments, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative embodiments.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure. A customer, via a subscription order, may order one or more services provided by cloud infrastructure system 1102. Cloud infrastructure system 1102 then performs processing to provide the services requested in the customer's subscription order. For example, a subscription order may be placed for enabling a customer to access resources of a particular resource provider during impersonation sessions. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer can be an individual or an enterprise. In certain other embodiments, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as devices 1002, 1004, 1006, and 1008 depicted in FIG. 10) and may be capable of operating one or more client applications. A user may use a client device to interact with cloud infrastructure system 1102, such as to request a service provided by cloud infrastructure system 1102. For example, a user may use a client device to request an impersonation-related service described in this disclosure.

In some embodiments, the processing performed by cloud infrastructure system 1102 for providing impersonation-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1102 for determining impersonation attributes, e.g., to modify access privileges or time periods in which users are permitted to impersonate based on resource usage trends. The data used for this analysis may include structured data (e.g., data stored in a database or structured according to a structured model) and/or unstructured data (e.g., data blobs (binary large objects)).

As depicted in the embodiment in FIG. 11, cloud infrastructure system 1102 may include infrastructure resources 1130 that can be utilized for facilitating the provision of various cloud services offered by cloud infrastructure system 1102. Infrastructure resources 1130 may include, for example, processing resources, storage or memory resources, networking resources, and the like.

In certain embodiments, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, a service for enabling cloud support, an email service, a notification service, a file transfer service, and the like.

Cloud infrastructure system 1102 may comprise multiple subsystems or components.

These subsystems or components may be implemented in software, or hardware, or combinations thereof. For example, as depicted in FIG. 11, cloud functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a User Interface (UI), such as cloud UI 1112, cloud UI 1114 cloud UI 1116, a web interface, and/or other UI and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via one or more of the UIs, e.g., via the cloud UIs, 1112, 1114 and/or 1116.

At operation 1136, the order is stored in order database 1118. Order database 1118 can be one of several databases operated by cloud infrastructure system 1102 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1102 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, the services and resources are provided to the requesting client device(s) and a notification of the provided service may be sent to customers on client devices 1104, 1106 and/or 1108 by order provisioning module 1124 of cloud infrastructure system 1102. In certain embodiments, for a customer requesting an impersonation-related service, the notification may include a confirmation that impersonation settings have been successfully configured.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1102 may include an identity management module 1128. Identity management module 1128 may be configured to provide identity services, such as access management and authorization services in cloud infrastructure system 1102. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
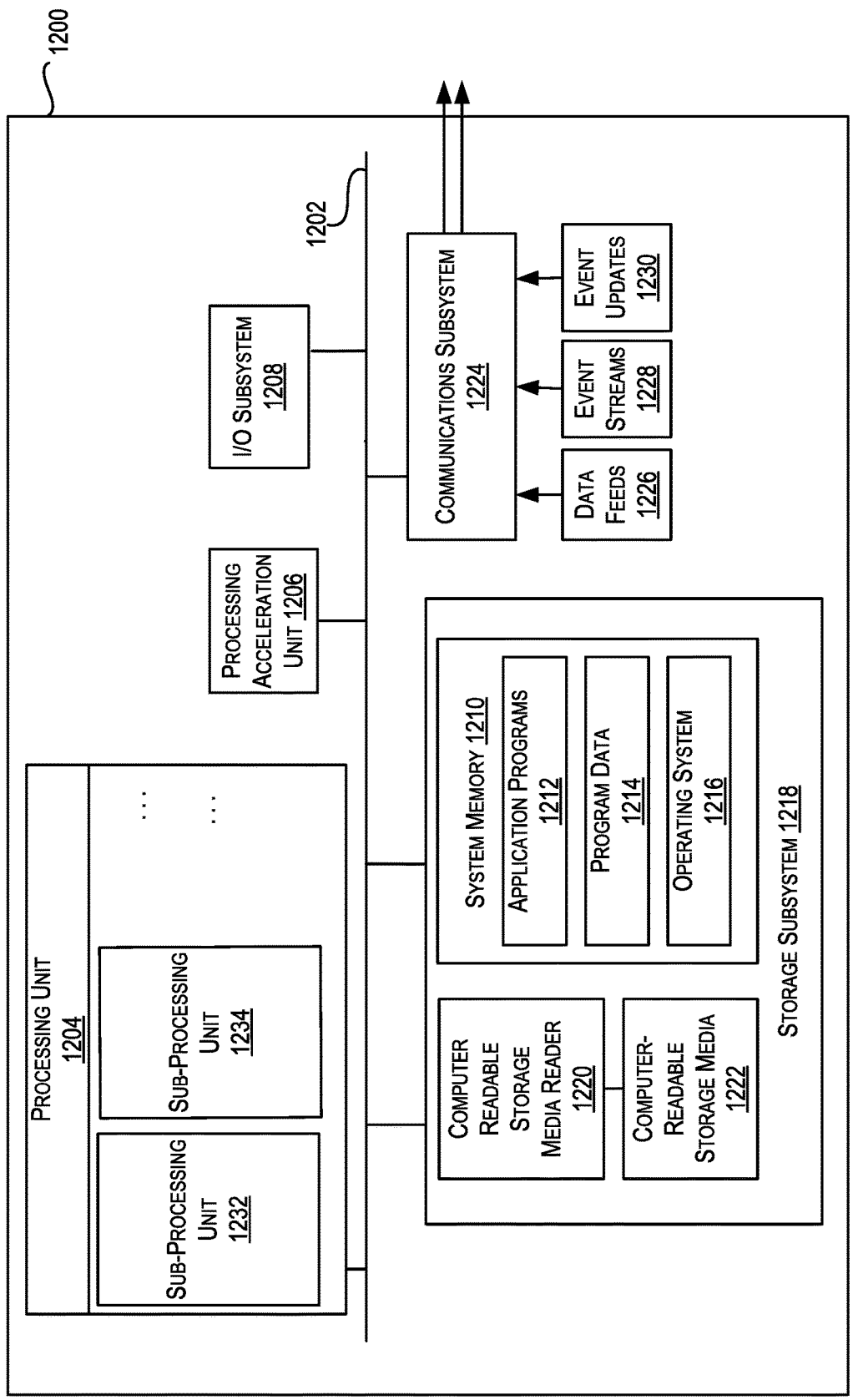
FIG. 12 shows an example computer system that can be used to implement an embodiment of the present disclosure.

FIG. 12 illustrates an exemplary computer system 1200, in which various embodiments of the present disclosure may be implemented. The system 1200 may be used to implement any of the computer systems described above (e.g., AMS 130 and/or IDP 120). As shown in FIG. 12, computer system 1200 includes a processing unit 1204 that communicates with a number of peripheral subsystems via a bus subsystem 1202. These peripheral subsystems may include a processing acceleration unit 1206, an input/output (I/O) subsystem 1208, a storage subsystem 1218 and a communications subsystem 1224. Storage subsystem 1218 includes tangible computer-readable storage media 1222 and a system memory 1210.

Bus subsystem 1202 provides a mechanism for enabling the various components and subsystems of computer system 1200 to communicate with each other. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In some embodiments, processing unit 1204 can be implemented using customized circuits, such as application specific integrated circuits (ASICs), or field programmable gate arrays (FPGAs).

In some embodiments, processing unit 1204 can execute a variety of programs in response to program code and can maintain multiple concurrently executing programs or processes. At any given time, some or all of the program code to be executed can be resident in processor(s) of the processing unit 1204 and/or in storage subsystem 1218. Through suitable programming, processor(s) of the processing unit 1204 can provide various functionalities described above. The processing acceleration unit 1206 can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. For example, system memory 1210 may store program instructions that are loadable and executable on processing unit 1204, as well as data generated during the execution of these programs.

Storage subsystem 1218 may include one or more non-transitory memory devices, including volatile and non-volatile memory devices. For example, system memory 1210 may be volatile (such as random access memory (RAM)) and/or non-volatile (such as read-only memory (ROM), flash memory, etc.) The RAM may contain data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing basic routines that help to transfer information between elements within computer system 1200, such as during start-up, may be stored in the ROM.

As depicted in FIG. 12, system memory 1210 may include application programs 1212. The application programs 1212 may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1218 may further include a computer-readable storage media reader 1220 that can be connected to computer-readable storage media 1222 to read data from the computer-readable storage media 1222.

Computer-readable storage media 1222 containing code, or portions of code, can include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

In certain embodiments, computer system 1200 may support virtualization technologies, including but not limited to virtualization of processing and memory resources. For example, computer system 1200 may provide support for executing one or more virtual machines. In certain embodiments, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. Communications subsystem 1224 may enable computer system 1200 to connect to one or more devices via the Internet. For example, the communication subsystem 1224 may be used for Internet based communication between an AMS and an IDP during processing of an impersonation request.

Communication subsystem 1224 may support both wired and/or wireless communication protocols. For example, in certain embodiments, communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In certain embodiments, communications subsystem 1224 may also receive data in the form of structured and/or unstructured data feeds 1226, event streams 1228, event updates 1230, and the like on behalf of one or more users who may use computer system 1200. By way of example, communications subsystem 1224 may be configured to receive data feeds 1226 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in the figure are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method, comprising:
   receiving, by an access manager that controls access to a computing resource, an impersonation request from a first user to impersonate a second user, wherein the impersonation request is received during a first session initiated by the first user opening an impersonation start URL, and wherein the second user has an access privilege that permits access to the computing resource;
   obtaining, by an authentication engine of the access manager, an impersonation plugin based on a policy mapping, the policy mapping comprising information associating the impersonation start URL to an impersonation policy, which is associated with the impersonation plugin;
   invoking, by an authorization engine of the access manager, the impersonation plugin, wherein the impersonation plugin is configured with specific authentication behavior for the computing resource and is separate from the authentication engine and the authorization engine, and the invoking comprises instantiating the impersonation plugin and allocating a set of computing resources used by the plugin during execution of plugin processing;
   executing, by the authorization engine of the access manager, the impersonation plugin to initiate the plugin processing using the allocated set of computing resources, wherein the plugin processing comprises:
      requesting, by the impersonation plugin, impersonation attributes from a particular identity provider identified by the impersonation policy, wherein the impersonation attributes are stored in a location inaccessible to the access manager, the impersonation attributes are sent to the impersonation plugin by the identity provider and are not sent to the authentication engine or the authorization engine of the access manager, the impersonation attributes comprise user attributes configured for the first user from whom the impersonation request was received, the user attributes indicate who the first user has permission to impersonate and a time period during which the first user is permitted to impersonate;
      determining, by the impersonation plugin based on the impersonation attributes obtained from the identity provider, that the impersonation attributes indicate that the second user identified in the impersonation request has given permission for the first user to impersonate the second user, and a current time is within the time period in which the user is permitted to impersonate; and
      in response to determining the second user identified in the impersonation request has given permission for the first user to impersonate the second user and the current time is within the time period in which the user is permitted to impersonate, delegating, by the impersonation plugin, authentication of the first user to the identity provider and re-authenticating, by the identity provider, the first user for the first session; and
   upon valid re-authentication of the first user for the first session, initiating, by the access manager, an impersonation session, wherein the initiating the impersonation session comprises switching a user associated with the first session from the first user to the second user thereby converting the first user session to the impersonation session.

2. The computer-implemented method of claim 1, further comprising: causing, by the access manager, a consent page to be presented to the first user, the consent page requesting a confirmation of the first user's intent to initiate the impersonation session.

3. The computer-implemented method of claim 1, further comprising:
   receiving, by the access manager during the impersonation session, a request from the first user for access to the computing resource; and
   providing, by the access manager, access to the computing resource in response to the request from the first user.

4. The computer-implemented method of claim 1, wherein the access manager directs requests for authenticating the first user to the identity provider, the identity provider performing authentication of the first user on behalf of the access manager.

5. The computer-implemented method of claim 1, wherein switching the user associated with the first session from the first user to the second user comprises updating a cookie to replace information about the first user with information about the second user.

6. The computer-implemented method of claim 1, wherein the first user does not have an access privilege for accessing the computing resource.

7. A non-transitory computer-readable storage medium storing instructions which, when executed by one or more processors of a computer system, cause the one or more processors to:

receive, by an access manager that controls access to a computing resource, an impersonation request from a first user to impersonate a second user, wherein the impersonation request is received during a first session initiated by the first user opening an impersonation start URL, and wherein the second user has an access privilege that permits access to the computing resource;

obtain, by an authentication engine of the access manager, an impersonation plugin based on a policy mapping, the policy mapping comprising information associating the impersonation start URL to an impersonation policy, which is associated with the impersonation plugin;

invoke, by an authorization engine of the access manager, the impersonation plugin, wherein the impersonation plugin is configured with specific authentication behavior for the computing resource and is separate from the authentication engine and the authorization engine, and the invoking comprises instantiating the impersonation plugin and allocating a set of computing resources used by the plugin during execution of plugin processing;

execute, by the authorization engine of the access manager, the impersonation plugin to initiate the plugin processing using the allocated set of computing resources, wherein the plugin processing comprises:

request, by the impersonation plugin, impersonation attributes from a particular identity provider identified by the impersonation policy, wherein the impersonation attributes are stored in a location inaccessible to the access manager, the impersonation attributes are sent to the impersonation plugin by the identity provider and are not sent to the authentication engine or the authorization engine of the access manager, the impersonation attributes comprise user attributes configured for the first user from whom the impersonation request was received, the user attributes indicate who the first user has permission to impersonate and a time period during which the first user is permitted to impersonate;

determine, by the impersonation plugin based on the impersonation attributes obtained from the identity provider, that the impersonation attributes indicate that the second user identified in the impersonation request has given permission for the first user to impersonate the second user, and a current time is within the time period in which the user is permitted to impersonate; and in response to determining the second user identified in the impersonation request has given permission for the first user to impersonate the second user and the current time is within the time period in which the user is permitted to impersonate, delegate, by the impersonation plugin, authentication of the first user to the identity provider and re-authenticating, by the identity provider, the first user for the first session; and upon valid re-authentication of the first user for the first session, initiate, by the access manager, an impersonation session, wherein the initiating the impersonation session comprises switching a user associated with the first session from the first user to the second user thereby converting the first user session to the impersonation session.

8. The non-transitory computer-readable storage medium of claim 7, wherein the instructions further cause the one or more processors to:

receive, by the access manager during the impersonation session, a request from the first user for access to the computing resource; and provide, by the access manager, access to the computing resource in response to the request from the first user, wherein the first user does not have an access privilege for accessing the computing resource.

9. A computer system comprising:

one or more processors; and a memory coupled to the one or more processors, the memory storing instructions that when executed by the one or more processors cause the one or more processors to:

receive, by an access manager that controls access to a computing resource, an impersonation request from a first user to impersonate a second user, wherein the impersonation request is received during a first session initiated by the first user opening an impersonation start URL, and wherein the second user has an access privilege that permits access to the computing resource;

obtain, by an authentication engine of the access manager, an impersonation plugin based on a policy mapping, the policy mapping comprising information associating the impersonation start URL to an impersonation policy, which is associated with the impersonation plugin;

invoke, by an authorization engine of the access manager, the impersonation plugin, wherein the impersonation plugin is configured with specific authentication behavior for the computing resource and is separate from the authentication engine and the authorization engine, and the invoking comprises instantiating the impersonation plugin and allocating a set of computing resources used by the plugin during execution of plugin processing;

execute, by the authorization engine of the access manager, the impersonation plugin to initiate the plugin processing using the allocated set of computing resources, wherein the plugin processing comprises:

request, by the impersonation plugin, impersonation attributes from a particular identity provider identified by the impersonation policy, wherein the impersonation attributes are stored in a location inaccessible to the access manager, the impersonation attributes are sent to the impersonation plugin by the identity provider and are not sent to the authentication engine or the authorization engine of the access manager, the impersonation attributes comprise user attributes configured for the first user from whom the impersonation request was received, the user attributes indicate who the first user has permission to impersonate and a time period during which the first user is permitted to impersonate;

determine, by the impersonation plugin based on the impersonation attributes obtained from the identity provider, that the impersonation attributes indicate that the second user identified in the impersonation request has given permission for the first user to impersonate the second user, and a current time is within the time period in which the user is permitted to impersonate; and in response to determining the second user identified in the impersonation request has given permission for the first user to impersonate the second user and the current time is within the time period in which the user is permitted to impersonate, delegate, by the impersonation plugin, authentication of the first user to the identity provider and re-authenticating, by the identity provider, the first user for the first session; and upon valid re-authentication of the first user for the first session, initiate, by the access manager, an impersonation session, wherein the initiating the impersonation session comprises switching a user associated with the first session from the first user to the second user thereby converting the first user session to the impersonation session.

* * * * *